United States Patent
Gaiser

(10) Patent No.: US 10,156,172 B2
(45) Date of Patent: Dec. 18, 2018

(54) DEVICE FOR RELEASE OF REACTANT INTO THE EXHAUST GAS STREAM OF AN INTERNAL COMBUSTION ENGINE

(71) Applicant: Eberspächer Exhaust Technology GmbH & Co. KG, Neunkirchen (DE)

(72) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 81 days.

(21) Appl. No.: 15/332,252

(22) Filed: Oct. 24, 2016

(65) Prior Publication Data
US 2017/0122167 A1 May 4, 2017

(30) Foreign Application Priority Data
Oct. 30, 2015 (DE) .................. 10 2015 118 572

(51) Int. Cl.
| | |
|---|---|
| *F01N 3/24* | (2006.01) |
| *F01N 3/20* | (2006.01) |
| *B01D 53/90* | (2006.01) |
| *B01D 53/94* | (2006.01) |
| *F01N 3/28* | (2006.01) |

(52) U.S. Cl.
CPC .............. *F01N 3/208* (2013.01); *B01D 53/90* (2013.01); *B01D 53/9431* (2013.01); *F01N 3/206* (2013.01); *F01N 3/2896* (2013.01); *B01D 2251/2067* (2013.01); *B01D 2257/40* (2013.01); *F01N 2610/02* (2013.01); *F01N 2610/10* (2013.01); *F01N 2610/105* (2013.01); *F01N 2610/14* (2013.01); *F01N 2610/1433* (2013.01); *F01N 2610/1446* (2013.01)

(58) Field of Classification Search
CPC ......... F01N 2610/14; F01N 2610/1446; F01N 2610/1473
See application file for complete search history.

(56) References Cited

U.S. PATENT DOCUMENTS

| | | | |
|---|---|---|---|
| 2007/0068525 A1 | 3/2007 | Offenhuber et al. | |
| 2007/0163239 A1* | 7/2007 | Hofmann ........... | B01D 53/9495 60/286 |
| 2008/0314027 A1 | 12/2008 | Barber et al. | |
| 2011/0179772 A1 | 7/2011 | Vieth | |

FOREIGN PATENT DOCUMENTS

| | | |
|---|---|---|
| DE | 198 19 579 C1 | 9/1999 |
| DE | 103 46 220 A1 | 4/2005 |
| DE | 10 2006 049 591 A1 | 5/2007 |

(Continued)

*Primary Examiner* — Jonathan Matthias
(74) *Attorney, Agent, or Firm* — McGlew and Tuttle, P.C.

(57) ABSTRACT

A device for releasing reactant (R) into the exhaust gas stream (A) of an internal combustion engine includes a reactant injection unit (20), a reactant delivery unit (12) for delivering reactant (R) from a reactant reservoir (14) to the reactant injection unit (20), a heating unit (18) for heating reactant (R) delivered by the reactant delivery unit (12) to the reactant injection unit (20). An actuating unit (32) actuates the reactant delivery unit (12), the heating unit (18) and the reactant injection unit (20). An overpressure valve (26) or/and a pressure storage unit (30) is provided downstream of the reactant delivery unit (12).

22 Claims, 1 Drawing Sheet

(56) References Cited

FOREIGN PATENT DOCUMENTS

| DE | 10 2009 015 124 A1 | 10/2010 | |
|---|---|---|---|
| DE | 102012223033 A1 * | 6/2014 | ........... F01N 3/2066 |
| DE | 10 2013 211182 A1 | 12/2014 | |
| DE | 10 2013 225938 A1 | 6/2015 | |
| WO | 00/79108 A1 | 12/2000 | |

* cited by examiner

DEVICE FOR RELEASE OF REACTANT INTO THE EXHAUST GAS STREAM OF AN INTERNAL COMBUSTION ENGINE

CROSS REFERENCE TO RELATED APPLICATIONS

This application claims the benefit of priority under 35 U.S.C. § 119 of German Application 10 2015 118 572.5 filed Oct. 30, 2015, the entire contents of which are incorporated herein by reference.

FIELD OF THE INVENTION

The present invention pertains to a device for the release of reactant into the exhaust gas stream of an internal combustion engine, comprising a reactant injection unit, a reactant delivery unit for delivering reactant from a reactant reservoir to the reactant injection unit, a heating unit for heating reactant delivered by the reactant delivery unit to the reactant injection unit, as well as an actuating unit for actuating the reactant delivery unit, the heating unit and the reactant injection unit.

BACKGROUND OF THE INVENTION

A device for releasing reactant into the exhaust gas stream of an internal combustion engine is well known from DE 10 2006 049 591 A1. The reactant to be released by this device is a urea solution. In order to mix a urea solution delivered by means of a reactant delivery unit to a reactant injection unit with the exhaust gas stream as efficiently as possible, the reactant delivered in the direction towards the reactant injection unit is heated, for example, to a temperature of about 200° C., in this prior-art device. At the same time, the reactant fed in liquid form into the exhaust gas stream before release is set under such high pressure that an evaporation of reactant before the release of reactant into the exhaust gas stream cannot occur. Such a device utilizes the effect that during the release of reactant into the exhaust gas stream, which reactant is heated and at first under increased pressure, a spontaneous expansion, which leads to a spontaneous evaporation of the reactant, occurs, on the one hand, and, on the other hand, leads to very fine reactant droplets of the portion of the reactant which did not spontaneously evaporate, as a result of which a very efficient and fine mixing of the reactant with the exhaust gas of an internal combustion engine flowing in an exhaust gas duct system is achieved.

SUMMARY OF THE INVENTION

An object of the present invention is to provide a device for releasing reactant into the exhaust gas stream of an internal combustion engine, with which in case of a structurally simple configuration, an efficient mixing of the reactant with the exhaust gas of an internal combustion engine receiving this reactant can be achieved.

According to the present invention, this object is accomplished by a device for releasing reactant into the exhaust gas stream of an internal combustion engine, comprising a reactant injection unit, a reactant delivery unit for delivering reactant from a reactant reservoir to the reactant injection unit, a heating unit for heating reactant delivered by the reactant delivery unit to the reactant injection unit, as well as an actuating unit for actuating the reactant delivery unit, the heating unit and the reactant injection unit.

In this case, an overpressure valve or/and a pressure storage unit is provided downstream of the reactant delivery unit.

By heating the reactant by means of the heating unit to a temperature that under normal conditions, i.e., under normal pressure, would also result in an evaporation of the reactant, the above-described effect of spontaneous evaporation or generation of a very fine reactant spray upon release from the reactant injection unit can be utilized. Consequently, such a device may already be used even at comparatively low exhaust gas temperatures, which would otherwise not be suitable for a sufficient evaporation of reactant. An improved conversion of a reactant, which is configured, for example, as a urea/water solution, into ammonia, in conjunction with an improved NOx conversion and a lower consumption of reactant in case of a simultaneously enabled lower volume of a catalytic converter provided in the exhaust gas duct system of combustion exhaust gases of an internal combustion engine, is also achieved in case of using the device according to the present invention. Due to the generation of very fine reactant droplets occurring in addition to the spontaneous evaporation of reactant, a faster evaporation of the reactant released in droplet form is also achieved because of the improved surface/volume conditions, since the weight of the droplets to be heated is proportional to the volume thereof. Further technical steps supporting the mixing of the reactant with the exhaust gases routed in the exhaust gas stream, e.g., a compressed air support during the spray generation or the mixing by means of mixing elements provided in the exhaust gas stream, can thus be omitted at least in part.

In this connection, it is especially important that structural measures that substantially improve the quality of the release of reactant into the exhaust gas stream be provided in the device according to the present invention. By providing an overpressure valve, it is ensured that defined pressure conditions, which result in a correspondingly defined release of reactant via the reactant injection unit, are always present at the beginning of a release phase. Since the reactant delivery unit can also be operated during non-release phases by providing the overpressure valve in order to set up and to maintain the desired reactant pressure, on the one hand, but to avoid an excessive rise in pressure by the action of the overpressure valve, on the other hand, it is not necessary to trigger an increase, which starts only with a delay, in the rate of delivery of the reactant delivery unit, at the beginning of a release phase, attributable to the drop in pressure occurring thereby in the line area downstream of the reactant delivery unit. This reactant delivery unit can, in principle, be operated such that during the transition into a release phase, sufficient reactant can be delivered in order to be able to release the desired quantity of reactant into the exhaust gas stream, on the one hand, but to avoid an excessive drop in pressure, especially a drop in pressure below the vapor pressure of the reactant, on the other hand.

Providing a pressure storage unit has the result that during a release phase, the pressure in the area lying downstream of the reactant delivery unit, especially in the area of the reactant injection unit, can be maintained essentially constant at a level, which ensures a defined release of reactant, even if the volume of reactant to be delivered during a release phase by the reactant delivery unit is not entirely sufficient to replace the reactant released into the exhaust gas stream during the release phase.

In an especially advantageous embodiment, both technical measures described above, i.e., providing the overpressure valve and providing the pressure storage unit, are implemented in combination, even though each of these measures on its own already contributes to an especially advantageously operating system.

In the device according to the present invention, the reactant delivery unit may comprise a reactant pump for delivering reactant to the reactant injection unit, the reactant pump being configured to generate a reactant pressure lying above a vapor pressure of the reactant heated by the heating unit. In this case, the reactant pump is preferably a continuously delivering pump, for example, a gear pump.

In order to maintain the pressure needed for preventing an evaporation of reactant in the device itself with simple structural measures especially in the area of the reactant injection unit even during a release phase and thus also to be able to ensure a defined release of reactant, it is suggested that the pressure storage unit comprise:

at least one compressible volume equalizing element in the flow path of the reactant downstream of the reactant delivery unit, or/and at least one elastically extensible line area for the reactant, or/and at least one compressible volume equalizing medium, preferably gas, separated from the reactant by an elastic element, preferably a membrane.

In order to be able to utilize the pressure equalizing effect and thus also the volume equalizing effect of the pressure storage unit especially efficiently, it is suggested that the pressure storage unit be provided in the area of the reactant injection unit.

Advantageously, in the device according to the present invention, a reactant buffer volume provided by the pressure storage unit is measured such that the following condition is met:

$$V_P > V_E - V_N$$

in which:

$V_P$ is the reactant buffer volume, $V_E$ is the reactant volume released by the reactant injection unit during a reactant injection operation, $V_N$ is the reactant volume delivered by the reactant delivery unit during a reactant injection operation.

It can thus be ensured that the reactant volume provided by the action of the pressure storage unit, on the one hand, and the action of the reactant delivery unit, on the other hand, during an injection operation, i.e., during a release phase, is sufficient to be able to release the desired quantity of reactant into the exhaust gas.

In order to be able to set the desired temperature of the reactant, on the one hand, and the pressure necessary for preventing an evaporation of reactant, on the other hand, in a defined manner in the device according to the present invention, it is further suggested that the actuating device for actuating the heating unit be configured on the basis of a reactant temperature in the area of the heating unit or/and of the reactant release unit (reactant injection unit) or/and on the basis of a desired reactant temperature, or/and for actuating the reactant delivery unit on the basis of a reactant pressure in the area of the heating unit or/and of the reactant injection unit or/and on the basis of a desired reactant pressure.

The present invention pertains, further, to an exhaust system for an internal combustion engine, comprising an exhaust gas-carrying duct and a device according to the present invention for releasing reactant into exhaust gas flowing in the exhaust gas-carrying duct.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
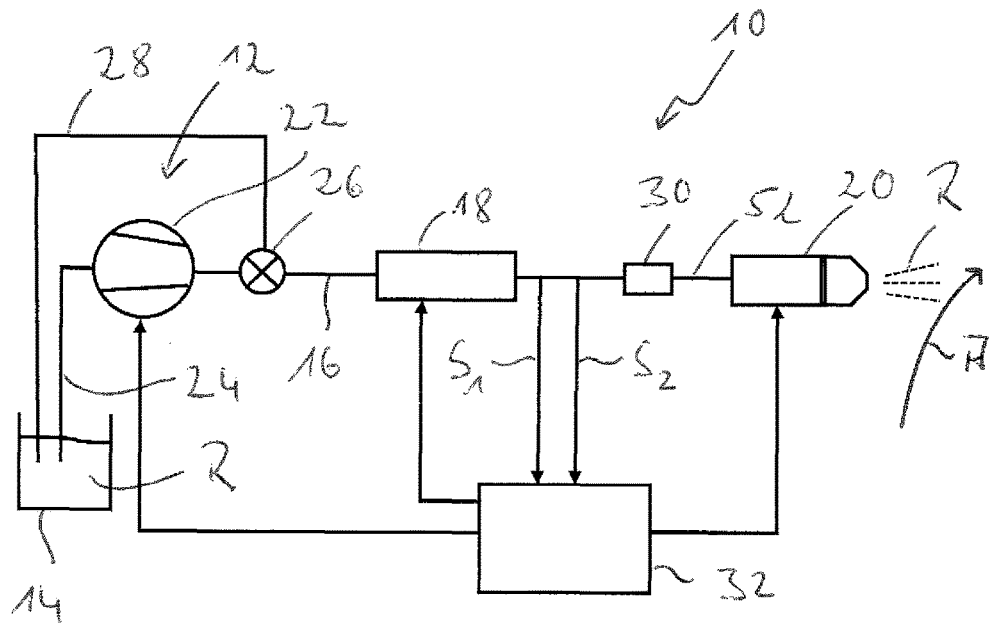
FIG. 1 is a schematic diagram of a device for releasing reactant into the exhaust gas stream of an internal combustion engine.

Referring to the drawings, a device for releasing reactant into the exhaust gas stream of an internal combustion engine is generally designated by 10 in FIG. 1. The device 10 comprises a reactant delivery unit 12, by means of which reactant R can be taken from a reactant reservoir 14, i.e., for example, from a storage container, and be delivered via a reactant line 16 to a, for example, electrically energizable heating unit 18. In the heating unit 18, the reactant R delivered by means of the reactant delivery unit 12 and pressurized is heated to an overheating temperature and further delivered to a reactant injection unit 20. The reactant R is released and injected by means of the reactant injection unit into the schematically shown exhaust gas stream A, which is routed in an exhaust gas-carrying duct of an exhaust system of an internal combustion engine.

The reactant delivery unit 12 comprises a reactant pump 22, which receives the reactant R from the reactant reservoir 14 via a feed line 24 and delivers it via an overpressure valve 26 into the reactant line 16 and in the direction towards the heating unit 18. Upon reaching a switching pressure, the overpressure valve 26 releases a return path 28 to the reactant reservoir 14, so that it is ensured that the reactant pressure in the flow area downstream of the overpressure valve 26 essentially does not exceed the switching pressure during the operation of the reactant pump 22. The reactant pump 22 is preferably configured as a continuously operating pump, for example, as a gear pump, which can, in principle, be operated such that it could generate a pressure lying above the switching pressure of the overpressure valve 26.

A pressure storage unit 30 in the area between the heating unit 18 and the reactant injection unit 20 is shown symbolically in FIG. 1. The functionality of the pressure storage unit 30 for providing a reactant buffer volume will still be described below especially also with reference to FIG. 2.

The device 10 comprises, further, an actuating unit 32, which is configured to actuate the reactant delivery unit 12, i.e., especially the reactant pump 22, the heating unit 18 and the reactant injection unit 20. In this case, a pressure signal, which reflects the pressure in the flow area downstream of the overpressure valve 26, especially in the area of the heating unit 18 or/and the reactant injection unit 20, is fed from one or more pressure sensors to the actuating unit 32 via a signal line S1. A temperature signal, which is delivered by one or more temperature sensors into the actuating unit 32 and which indicates the temperature of the reactant especially in the area of the heating unit 18 or/and of the reactant injection unit 20, is introduced via a signal line S2. Further, additional information, e.g., about the operating state of an internal combustion engine and thus also the quantity of exhaust gas released, is fed to the actuating unit 32.

The actuating unit 32, which may, for example, also be integrated into an engine control device, actuates the heating unit 18 such that the reactant in the area of the heating unit 18 and also in the line area then following downstream and in the area of the reactant injection unit 20 lies in a range between 100° C. and 370° C. For example, a desired temperature for the reactant R may be in a range between 120° C. and 300° C., preferably between 130° C. and 250° C., and most preferably between 150° C. and 200° C. The desired temperature of the reactant may, of course, be selected as a function of the reactant to be used. A urea/water solution is preferably used as a reactant. Other types of reactants, e.g., denoxium or isocyanic acid, may also be used.

In order to prevent the reactant R, which is at such a high temperature, from evaporating already before the release from the reactant injection unit 20, i.e., within the device 10, the reactant pump 22 is operated such that in the flow area of the reactant R lying downstream of same, a reactant pressure lying above a vapor pressure of the reactant R at the desired temperature thereof is reached and maintained. In particular, the switching pressure of the overpressure valve 26 is also selected such that if this is reached and thus a further increase in pressure will no longer occur, the reactant pressure is above the vapor pressure of the reactant R.

Figure 2:
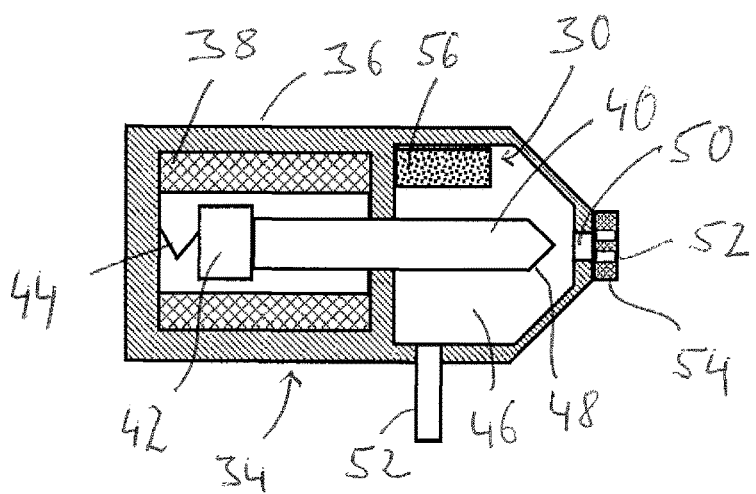
FIG. 2 is a sectional view of a reactant injection unit of the device shown in FIG. 1.

The actuating unit 32 actuates an electromagnet array 34 of the reactant injection unit 20, which electromagnet array is schematically shown in FIG. 2, for releasing reactant R by means of the reactant injection unit 20. This reactant injection unit comprises an electromagnet coil 38 arranged in a housing 36 and an anchor 42 movable with a locking element 40. By means of a prestressing spring 44, the locking element-anchor assembly unit is prestressed in a direction towards blocking a release chamber 46 in the housing 36. In this case, the locking element 40 is seated with a tip area 48 at the edge of an opening 50 provided in the housing 36. The reactant, which is fed via a line 52, for example, from the heating unit 18, cannot be released from the release chamber 46 in this state. Upon energizing the coil array 34, the locking element-anchor assembly unit is moved in a direction towards an open position shown in FIG. 2 by corresponding electromagnetic interaction, in which open position the release chamber 46 is open via the opening 50 and thus the pressurized reactant R is released to the outside through the opening 50 and a plurality of nozzle openings 52 of a release nozzle unit, generally designated by 54, also called orifice disk, and is injected into the exhaust gas A. The duration of a respective release phase, i.e., the duration, during which in a cycled operation, the locking element 40 is in its open position, and the ratio of the durations of the release phases to the durations of the non-release phases, during which the locking element 40 is in its open position and thus prevents a release of reactant, can be set as a function of the necessary quantity of reactant. The reactant injection unit 20 is actuated by the actuating unit 32, for example, based on the reactant quantity needed for carrying out such a cycled operation with alternating release phases and non-release phases.

During a release phase, the reactant pressure at first lying in the range of the switching pressure of the overpressure valve 26 drops below the switching pressure of the overpressure valve 26 in the area downstream of the overpressure valve 26 and especially in the area of the heating unit 18 and of the reactant injection unit 20. The overpressure valve 26 closes as soon as the switching pressure has dropped below the switching pressure. Since the reactant pump is operated essentially continuously in order to maintain at least the switching pressure, no change in the operation of the reactant pump 22 is, in principle, necessary even at the beginning of a respective release phase. The reactant pump 22 is operated such that even when the locking element 40 is positioned in the open position, i.e., during a release phase, the reactant pressure, which at first dropped below the switching pressure, cannot drop below a lower limit pressure, which may be, for example, in the range of 110% to 120% of the vapor pressure of the reactant R especially in the area of the heating unit 18 and of the reactant injection unit 20. It is thus ensured that even during a release phase, an evaporation of the reactant is still prevented in the device 10 itself in the flow area downstream of the overpressure valve 26 by a reactant pressure not dropping below the lower limit pressure; nevertheless, a sufficiently high and defined pressure can be maintained in order to inject a defined quantity of reactant into the exhaust gas stream A.

In this embodiment of the device 10, for example, even without the pressure storage unit 30, the reactant pump 22 is thus configured and operated such that it is capable of avoiding a dropping of the reactant pressure below the lower limit pressure and thereby of delivering a sufficiently large quantity of reactant, in order to be able to release the quantity of reactant desired for a respective release phase into the exhaust gas stream A. The pressure storage unit 30, shown in FIG. 1, of the device 10 also leads to the reactant pressure, especially in the area of the reactant injection unit 20 and also of the heating unit 18, remaining at a high level, for example, in the range of the switching pressure of the overpressure valve 26 or a corresponding pressure, but in any case not dropping below the lower limit pressure, during a respective release phase, independently of whether the overpressure valve 26 is provided or not, but preferably in combination with the overpressure valve 26.

The pressure storage unit 30 provides a reactant buffer volume, i.e., a volume, in which during a non-release phase, i.e., when the locking element 40 is positioned in the open position, pressurized reactant R is received. If the locking element 40 is moved into its open position and reactant is released from the release chamber 46 via the opening 50, reactant R from the reactant buffer volume provided by the pressure storage unit 30 can compensate the reactant R already released via the opening 50 and the reactant pressure can be maintained especially also in the area of the reactant injection unit 20. In order to ensure that a substantial drop in the reactant pressure remains, for example, in the range of the switching pressure or of a correspondingly high pressure, but in any case does not drop below the lower limit pressure, the reactant buffer volume provided by the pressure storage unit 30 is preferably measured such that it is greater than the difference between the reactant volume released during a reactant injection operation, i.e., during a release phase, into the exhaust gas stream A and the reactant volume delivered by the reactant delivery unit during a release phase.

An exemplary embodiment of the pressure storage unit 30 is schematically shown in FIG. 2. The pressure storage unit 30 shown there comprises a pressure storage element 38 that is compressible, i.e., its volume changes under a pressure load. This pressure storage element is provided in the area of the release chamber 46 and can thus provide a volume balance especially wherever reactant is released from the reactant injection unit 20. For example, the pressure storage element 36 can be made of closed-cell foam material. A gas volume enclosed in a flexible shell, for example, made of plastic material, may also provide the desired compressibility. A plurality of such compressible pressure storage elements 36 may, of course, be provided in the area of the reactant injection unit 20 or/and also in the areas downstream thereof.

In an alternative embodiment, the pressure storage unit 30 comprises an elastically extensible line area, i.e., for example, a line section made of rubber material or similarly elastic material. This line area—line section—can be expanded in case of a corresponding rise in pressure and contract again and thus compensate the released reactant volume or a part thereof during a release phase, i.e., if a drop in pressure occurs.

In another alternative embodiment, the pressure storage unit 30 comprises, for example, a line area branching off from the line 52 or the reactant line 16 with a closed gas volume, separated from the reactant stream by a membrane. This membrane can be deformed by the reactant pressure and thus the gas contained in the closed volume can be pressurized and compressed. Combinations of a variety of pressure storage elements, each of which may provide a reactant buffer volume in case of pressurization, are, of course, also possible.

Providing the pressure storage unit 30 and thus providing a reactant buffer volume has, further, the advantage that the device 10 cannot be damaged even at comparatively low temperatures by a freezing and thereby expanding reactant, and thus an emptying of the device 10 is not necessary. The volume necessary for the expansion of the reactant at comparatively low temperatures can be provided by the reactant buffer volume of the pressure storage unit 30.

It is possible with the above-described device to keep the reactant R at a reactant pressure above the vapor pressure especially in the area of the heating unit 18 and of the reactant injection unit 20 during the non-release phases, wherein this vapor pressure in each case in association with an overheating temperature to be provided in the area of the heating unit 18 can be determined taking into account the vapor pressure curve of a correspondingly used reactant. During the release phases, the reactant R under increased pressure is released in an overheated state from the reactant injection unit 20. A spontaneous expansion of the reactant occurs thereby, which leads to a portion of the reactant R likewise spontaneously evaporating, i.e., thus being introduced in vapor form into the exhaust gas stream A. The remaining, i.e., nonevaporated portion of the reactant R released from the reactant injection unit 20 is released into the exhaust gas stream A in the form of very small droplets with a size in the submicrometer range. On the one hand, this small droplet size supports the fast distribution of the reactant R in the exhaust gas stream and supports the fast evaporation of same first still in droplet form, i.e., in principle, in liquid form of the reactant present, on the other hand, since only a very small reactant volume is to be heated and evaporated in each of these droplets with a very small size. Because of this spontaneously occurring evaporation and the subsequently very rapidly occurring evaporation of the reactant released in droplet form, the residence time of liquid reactant in the area of the reactant injection unit 20 is very short, so that the risk of formation of reaction byproducts, which could lead to a compromise of the functionality of the reactant injection unit 20, is mostly eliminated. A compressed air support for spray generation is thus not necessary, and other steps used for mixing the reactant with the exhaust gas stream A, e.g., providing mixing elements in the downstream area of an exhaust gas duct system, can also be mostly dispensed with.

Utilizing the above-described effect of spontaneous evaporation upon release from the reactant injection unit 20, a defined release of reactant is ensured by the device configured according to the present invention, which can ensure an essentially constant, in any case not very sharply dropping reactant pressure due to the use of the overpressure valve 26 or the use of the pressure storage unit 30 or the simultaneous use of the overpressure valve 26 and of the pressure storage unit 30 even during release phases. Because of the very uniform pressure conditions in the area of the reactant injection unit, a uniform spray mist of the reactant released still in droplet form is generated, the distribution of which also remains essentially identical over the duration of a release phase. In this case, structural measures lying within the scope of the present invention or changes may, of course, be made to the above-described device 10. For example, the heating unit 18 may comprise a heat conductor integrated in a line section, possibly also a heat conductor around which the reactant can flow and thus which can be brought into direct thermal interaction therewith, which heat conductor can be energized by actuation of an actuating device, to heat the reactant to the overheating temperature especially in the area close to the reactant injection unit 20. Further, the pressure sensor may be arranged in the area lying upstream of the heating unit 18, i.e., for example, between the heating unit 18 and the overpressure valve. An integration of the sensors into the heating unit 18 or/and the reactant injection unit 20 is also possible.

In order to improve the mixing of the reactant released into the exhaust gas stream with the exhaust gas in case of using the device according to the present invention as well, an element for secondary dispersion, i.e., a so-called mixing element, may be provided in the exhaust system downstream of this injection area, i.e., in the exhaust gas duct. On the impact surfaces of such a mixing element, the reactant droplets impacting thereon may burst. The heated surfaces of such a mixing element support, further, the further evaporation of reactant. In order to avoid a compromise of the functionality of the electromagnet array in the reactant injection unit due to the comparatively high reactant temperature, this array may be arranged in an area lying further removed from the release chamber. For this, for example, the locking element may also be configured with a comparatively long length. The reactant injection unit may also be configured with a closing point detection in order to detect when the locking element is seated on the housing 36 and the opening 50 closes, in order to thus carry out an electrical compensation of a heat-related change in length. A mechanical compensation of such a heat-related change in length is also possible.

Moreover, in order to keep the volume as low as possible in the flow path of the reactant during the release from the release chamber 46, in which an evaporation of reactant occurs already before the release into the exhaust gas stream, providing the release nozzle unit 54 could be dispensed with or this release nozzle unit could already be integrated into the housing 36 by means of corresponding configuration with a plurality of openings.

While specific embodiments of the invention have been shown and described in detail to illustrate the application of the principles of the invention, it will be understood that the invention may be embodied otherwise without departing from such principles.

What is claimed is:

1. A device for releasing reactant into an exhaust gas stream of an internal combustion engine, the device comprising:
   a reactant injection unit comprising a release chamber;
   a reactant delivery unit for delivering reactant from a reactant reservoir to the release chamber of the reactant injection unit;
   a heating unit for heating reactant delivered by the reactant delivery unit to the reactant injection unit;
   an actuating unit configured to actuate the reactant delivery unit, to actuate the heating unit and to actuate the reactant injection unit; and
   a pressure storage unit or both an overpressure valve and a pressure storage unit provided downstream of the reactant delivery unit, the pressure storage unit comprising at least one compressible volume equalizing element arranged in the release chamber of the reactant injection unit.

2. A device in accordance with claim 1, wherein the reactant delivery unit comprises a reactant pump for delivering reactant to the reactant injection unit, the reactant pump being configured to generate a reactant pressure lying above a vapor pressure of the reactant heated by the heating unit.

3. A device in accordance with claim 2, wherein the reactant pump comprises a continuously delivering pump.

4. A device in accordance with claim 3, wherein the reactant pump comprises a gear pump.

5. A device in accordance with claim 1, wherein the pressure storage unit further comprises:
   at least one elastically extensible line area for the reactant; or
   at least one compressible volume equalizing medium separated from the reactant by an elastic element; or
   a combination of at least one elastically extensible line area for the reactant and at least one compressible volume equalizing medium separated from the reactant by an elastic element.

6. A device in accordance with claim 5, wherein the medium of the at least one compressible volume equalizing medium is gas and the elastic element is a membrane.

7. A device in accordance with claim 5, wherein the elastic element is a membrane.

8. A device in accordance with claim 1, wherein the pressure storage unit is provided in an area of the reactant injection unit.

9. A device in accordance with claim 1, wherein a reactant buffer volume provided by the pressure storage unit is measured such that the following condition is met:

$$V_P > V_E - V_N$$

in which:
$V_P$ is the reactant buffer volume;
$V_E$ is the reactant volume released by the reactant injection unit during a reactant injection operation; and
$V_N$ is the reactant volume delivered by the reactant delivery unit during a reactant injection operation.

10. A device in accordance with claim 1, wherein the actuating unit is configured to actuate the heating unit on a basis of a reactant temperature in an area of the heating unit or on a basis of a reactant temperature in an area of the reactant injection unit or on a basis of a desired reactant temperature or on a basis of any combination of a reactant temperature in an area of the heating unit and a reactant temperature in an area of the reactant injection unit and a desired reactant temperature.

11. A device in accordance with claim 1, wherein the actuating unit is configured to actuate the reactant delivery unit on a basis of a reactant pressure in an area of the heating unit or of on a basis of a pressure in an area of the reactant injection unit or on the basis of a desired reactant pressure or on a basis of any combination of a reactant pressure in an area of the heating unit, and a pressure in an area of the reactant injection unit and a desired reactant pressure, the reactant injection unit comprising a housing, an anchor and a locking element, the housing comprising the release chamber, an inner housing portion and a housing interior space, the anchor being connected to the locking element such that the locking element moves based on movement of the anchor, the release chamber being separated from the housing interior space via the inner housing portion, the inner housing portion comprising an opening, the anchor being arranged in the housing interior space, the locking element extending through the opening, wherein at least one portion of the locking element is arranged in the housing interior space and another portion of the locking element is arranged in the release chamber.

12. An exhaust system for an internal combustion engine, the exhaust system comprising:
   an exhaust gas-carrying duct; and
   a device for releasing reactant into exhaust gas flowing in the exhaust gas-carrying duct, the device comprising:
      a reactant injection unit comprising a release chamber;
      a reactant delivery unit for delivering reactant from a reactant reservoir to the release chamber of the reactant injection unit;
      a heating unit for heating reactant delivered by the reactant delivery unit to the reactant injection unit;
      an actuating unit configured to actuate the reactant delivery unit, the heating unit and the reactant injection unit; and
      a pressure storage unit or both an overpressure valve and a pressure storage unit provided downstream of the reactant delivery unit, the pressure storage unit comprising at least one compressible volume equalizing element arranged in the release chamber of the reactant injection unit.

13. An exhaust system in accordance with claim 12, wherein the reactant delivery unit comprises a reactant pump for delivering reactant to the reactant injection unit, the reactant pump being configured to generate a reactant pressure lying above a vapor pressure of the reactant heated by the heating unit.

14. An exhaust system in accordance with claim 13, wherein the reactant pump comprises a continuously delivering pump.

15. An exhaust system in accordance with claim 14, wherein the reactant pump comprises a gear pump.

16. An exhaust system in accordance with claim 12, wherein the pressure storage unit further comprises:
   at least one elastically extensible line area for the reactant; or
   at least one compressible volume equalizing medium separated from the reactant by an elastic element; or
   a combination of at least one elastically extensible line area for the reactant and at least one compressible volume equalizing medium separated from the reactant by an elastic element.

17. An exhaust system in accordance with claim 16, wherein the medium of the at least one compressible volume equalizing medium is gas and the elastic element is a membrane.

18. An exhaust system in accordance with claim 16, wherein the elastic element is a membrane.

19. An exhaust system in accordance with claim 12, wherein the pressure storage unit is provided in an area of the reactant injection unit.

20. An exhaust system in accordance with claim 12, wherein a reactant buffer volume provided by the pressure storage unit is measured such that the following condition is met:

$$V_P > V_E - V_N$$

in which:

$V_P$ is the reactant buffer volume;

$V_E$ is the reactant volume released by the reactant injection unit during a reactant injection operation; and $V_N$ is the reactant volume delivered by the reactant delivery unit during a reactant injection operation.

21. An exhaust system in accordance with claim 12, wherein the actuating unit is configured to actuate the heating unit on a basis of a reactant temperature in an area of the heating unit or on a basis of a reactant temperature in an area of the reactant injection unit or on a basis of a desired reactant temperature or on a basis of any combination of a reactant temperature in an area of the heating unit and a reactant temperature in an area of the reactant injection unit and a desired reactant temperature.

22. An exhaust system in accordance with claim 12, wherein the actuating unit is configured to actuate the reactant delivery unit on a basis of a reactant pressure in an area of the heating unit or of on a basis of a pressure in an area of the reactant injection unit or on the basis of a desired reactant pressure or on a basis of any combination of a reactant pressure in an area of the heating unit, and a pressure in an area of the reactant injection unit and a desired reactant pressure, the reactant injection unit comprising a housing, an anchor and a locking element, the housing comprising the release chamber, an inner housing portion and a housing interior space, the anchor being connected to the locking element such that the locking element moves based on movement of the anchor, the release chamber being separated from the housing interior space via the inner housing portion, the inner housing portion comprising an opening, the anchor being arranged in the housing interior space, the locking element extending through the opening, wherein at least one portion of the locking element is arranged in the housing interior space and another portion of the locking element is arranged in the release chamber.

* * * * *